United States Patent
Gitis et al.

(10) Patent No.: US 6,324,918 B1
(45) Date of Patent: Dec. 4, 2001

(54) BIDIRECTIONAL FORCE SENSOR

(75) Inventors: Norm Gitis, Cupertino; Michael Vinogradov; Vlad Dorfman, both of Sunnyvale, all of CA (US)

(73) Assignee: Center for Tribology, Inc., Campbell, CA (US)

( * ) Notice: Subject to any disclaimer, the term of this patent is extended or adjusted under 35 U.S.C. 154(b) by 0 days.

(21) Appl. No.: 09/588,054

(22) Filed: Jun. 5, 2000

(51) Int. Cl.$^7$ ................ G01L 7/00; G01L 5/00; G01D 7/00
(52) U.S. Cl. .............. 73/862; 177/211; 73/862.042; 73/862.045; 73/862.044; 73/862.01
(58) Field of Search .............. 73/862.391, 862.632, 73/862.633, 862.634, 862.627, 862.637

(56) References Cited

U.S. PATENT DOCUMENTS

| | | | |
|---|---|---|---|
| 3,577,779 | * 5/1971 | Laimins | 73/633 |
| 4,505,345 | * 3/1985 | Jetter | 177/211 |
| 4,628,745 | 12/1986 | Hatamura . | |
| 4,785,673 | 11/1988 | Aumard . | |
| 6,038,933 | * 3/2000 | Meyer | 73/862.045 |

* cited by examiner

*Primary Examiner*—Benjamin R. Fuller
*Assistant Examiner*—Andre Allen
(74) *Attorney, Agent, or Firm*—Ely Zborovsky Patent Bureau (57) ABSTRACT

The sensor of the invention comprises a flexible beam of a rectangular cross section with rigid solid end blocks at both ends for securing the sensor in a tester. The beam has two symmetrically-shaped through slots cut in mutually perpendicular directiors so that they are partially intersect within a body of the beam. Each slot has at its opposite ends notches which are wider than the slots so that the distance from the inner wall of the notch to the outer side surface of the beam is shorter than the distance to this surface from the inner wall of the slot. Strain gauges are attached to mutually perpendicular surfaces at the ends of the beam which are flexible in the direction of the force being measured and are rigid in the perpendicular direction. Under effect of the loading force and of the friction force, the flexible beam acts as a pair of overlapped and mutually perpendicular parallelograms. The overlapped slots make it possible to reduce the overall length of the beam and to increase the range of working temperatures of the sensor, to suppress the effect of natural frequency resonance and thermal deformation, and thus to improve reliability and accuracy of measurements.

8 Claims, 6 Drawing Sheets

BIDIRECTIONAL FORCE SENSOR

FIELD OF THE INVENTION

The present invention relates to the field of tribology and, more particularly, to bi-directional force sensor.

BACKGROUND OF THE INVENTION

Tribology is a science of friction, wear, and lubrication on friction surfaces. Many different types of strain-gauges and other devices for force measuring are known in the art.

U.S. Pat. No. 4,785,673 issued in 1988 to Jean-Pierre Aumard describes a force measurement sensor for measuring at least two forces. This sensor comprises a beam with notches for imparting flexibility to the beam in the direction of action of forces to be measured. The aforementioned flexibility is required to increase reversible deformation of the beam under effect of the applied forces and thus to make it possible to measure these forces with sensing elements such as strain gauges attached to the respective deformable portions of the beam.

In the aforementioned U S. Pat. No. 4,785,673 the beam has a first pair of symmetrical transverse notches and second pair of symmetrical transverse notches at a distance from the first pair.

However, the above sensor measures two parallel forces, which are located in the same or in parallel planes. This essentially limits the field of application of the sensor. Another disadvantage of the aforementioned sensor is that the sensing elements, such as strain gauges, are arranged sequentially. As a result, the sensor has an increased overall dimension in the longitudinal direction and therefore does not possess rigidity in a force transmission direction and presents problems associated with excitation of natural frequency resonance. The natural frequency resonance, in turn, affects accuracy of measurements and limits the dynamic range of forces to be measured. Furthermore, an increased length of the sensor makes it unsuitable for measuring forced under increased temperature since the sensor is subject to significant temperature deformations.

U.S. Pat. No. 4,628,745 issued in 1986 to Yotaro Hatamura describes a multi-axis load sensor, which has radial plates adapted to detect moments produced by forces acting in planes which neither coincide nor parallel to the standard axis of at least one of the parallel plate structure. The sensor is exemplified as a device for measuring loads produced by a mechanical robot having several degrees of freedom. This sensor is more universal than the one described in U S. Pat. No. 4,785,673. However, it is still sensitive to temperature deformations and is subject to excitation of natural frequency resonance. This is because, though the load sensing elements are arranged in different non-coincident and non-parallel planes, they are still arranged in sequence and therefore the sensor has an increased length and entails the same disadvantages as the previously described sensor. Furthermore, the beam of the sensor is significantly weakened by multiple cut-outs which extend inwardly from the external surface of the beam. this is because the sensor is intended for specific application in robots which manipulate with limited forces. This limitation is an essential disadvantage of the sensor of U.S. Pat. No. 4,628,745 which makes it inapplicable for measuring large forces.

OBJECTS OF THE INVENTION

The object of the present invention is to provide a bidirectional load measurement sensor which allows to decrease the overall length of the sensor, to increase its sensitivity, to reduce susceptibility to natural frequency resonance, to decrease temperature errors, to improve accuracy of measurement, and to increase the dynamic range of forces to be measured. Another object is to improve compactness of the aforementioned sensor and to ensure high rigidity in the force transmission direction.

SUMMARY OF THE INVENTION

The sensor of the invention comprises a flexible beam of a rectangular cross section with rigid solid end blocks at both ends for securing the sensor in a tester, e.g., for testing and measuring loading and friction forces and tribological properties of materials and lubricants. The beam has two symmetrically-shaped through slots cut in mutually perpendicular directions so that they partially intersect within a body of the beam. Each slot has at its opposite ends notches which are wider than the slots. As a result, the distance from the inner wall of the notch to the outer side surface of the beam is shorter than the distance to this surface from the inner wall of the slot. The thinned portions of the beam impart anisotropic flexibility to the beam required for increasing sensitivity of the sensor. The aforementioned anisotropic flexibility is ensured in the direction perpendicular to the direction of a respective slot and thus coincides with the direction of the force to be measured. Force sensing elements, such as strain gauges, are attached to mutually perpendicular surfaces which are flexible in the direction of the force being measured and are rigid in the perpendicular direction. Under effect of the loading force and of the friction force, the flexible beam acts, due to a provision of a pair of mutually perpendicular through slots, as a pair of overlapped and mutually perpendicular parallelograms. The overlapped slots make it possible to reduce the overall length of the beam and thus to increase the range of working temperatures of the sensor, to suppress the effect of natural frequency resonance and thermal deformation, and thus to improve reliability and accuracy of measurements.

DETAILED DESCRIPTION OF THE INVENTION

Figure 1A:
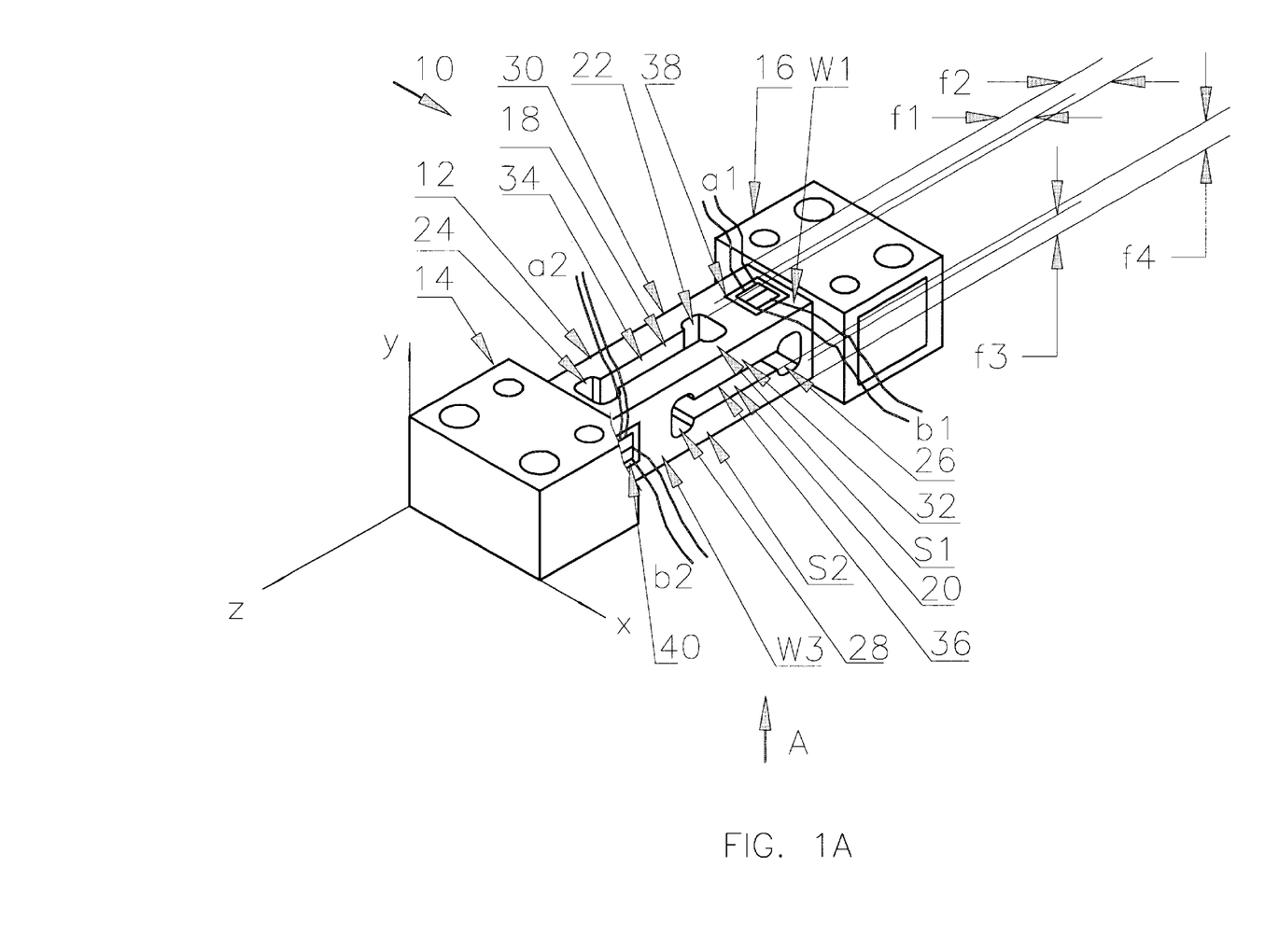
FIG. 1A is a three-dimensional view of the sensor of the invention.

The sensor of the invention is shown in FIG. 1A, which is a three-dimensional view of the sensor. The sensor, which in general is designated by reference numeral 10, comprises a flexible beam 12 of a rectangular cross section with rigid solid end blocks 14 and 16 at both ends for securing the sensor in a tester (not shown), e.g., for testing and measuring loading and friction forces and tribological properties of materials and lubricants. The beam 12 has two symmetrically-shaped through slots 18 and 20 cut in mutually perpendicular directions Y and X, respectively. The slots 18 and 20 partially intersect within a body of the beam 12.

Each slot has on its opposite ends a through hole or notch, i.e., notches 22, 24 on the opposite ends of the slot 18 and through notches 26, 28 on the opposite ends of the slot 20, respectively. The notches 22, 24 and 26, 28 are wider than the respective slots 18 and 20.

The distances "$f_1$" and "$f_3$" from the inner walls of the respective notches 22 and 28 to the outer side surfaces 30 (FIG. 1A) and 32 (FIG. 1B) of the beam are shorter than the distances to the surface 30 and 32 from the inner walls 34 (FIG. 1A) and 36 (FIG. 1B) of the slots 18 and 20. The thinned portions of the beam 12 impart anisotropic flexibility to the beam required for increasing sensitivity of the sensor. The aforementioned anisotropic flexibility is ensured in the direction perpendicular to the direction of a respective slot and thus coincides with the direction of the force to be measured. In other words, for a force acting in the direction of axis Y flexibility will be provided only in the direction of axis Y by the notches 26 and 28 of the slot 20, and for a force acting in the direction of axis X flexibility will be provided only in the direction of axis X by the notches 22 and 24 of the slot 18.

Figure 1B:
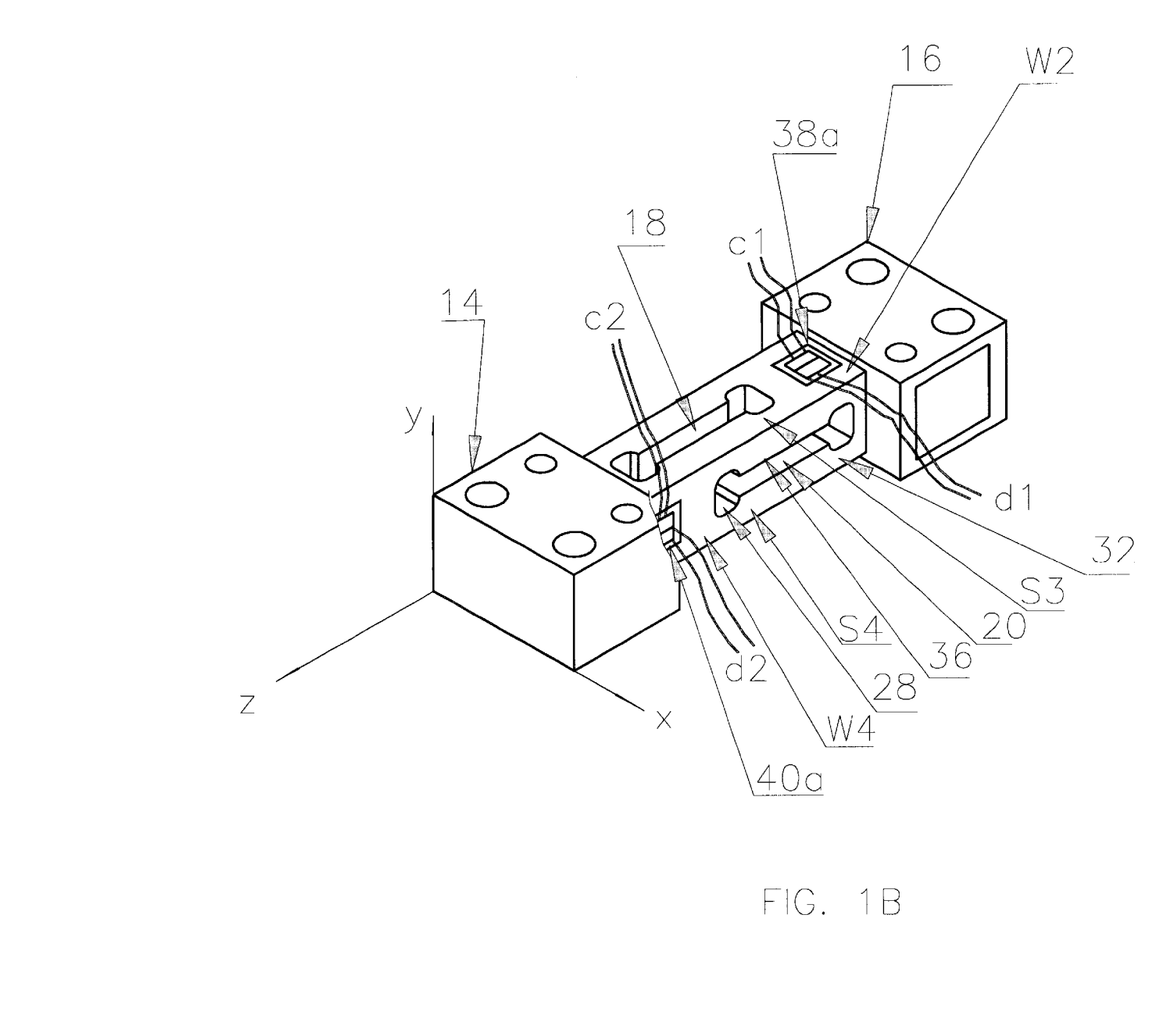
FIG. 1B is a three-dimensional view of the sensor of FIG. 1A in the direction of arrow A.

In fact, the beam 12 with the slots 18 and 20 cut through the body of the beam in two different intersecting directions, which in the embodiment shown in FIG. 1A and FIG. 1B are two mutually perpendicular directions, can be compared with a pair of mutually overlapped parallelograms combined in one body which will be described later in connection with the operation of the sensor.

Force sensing elements, such as strain gauges 38 and 40 (FIG. 1A), each of which consists of two parts, are attached to mutually perpendicular surface areas $S_1$ and $S_2$ of deformable portions (descibed below) which are flexible enough to comply with sensitivity of strain gauges used for measuring deformations and registering the measured deformations with appropriate electronic instrumentation (not shown).

Similar paired strain gauges 38a and 40a are attached to mutually perpendicular surface areas $S_3$ and $S_4$ on the opposite side of the beam as shown in FIG. 1B, which is a view in the direction of arrow A in FIG. 1A.

The dimensions of the slots 18, 20 as well as the notches 22, 24 and 26, 28 are chosen in connection with the material of the beam so that deformations caused by the measured forces be reversible without residual deformations and directly proportional to the aforementioned forces. It is understood that the strain gauges 38, 38a, and 40, 40a should be chosen so as to respond to mechanical deformations caused by measured forces within the entire possible range of the forces.

Figure 2:
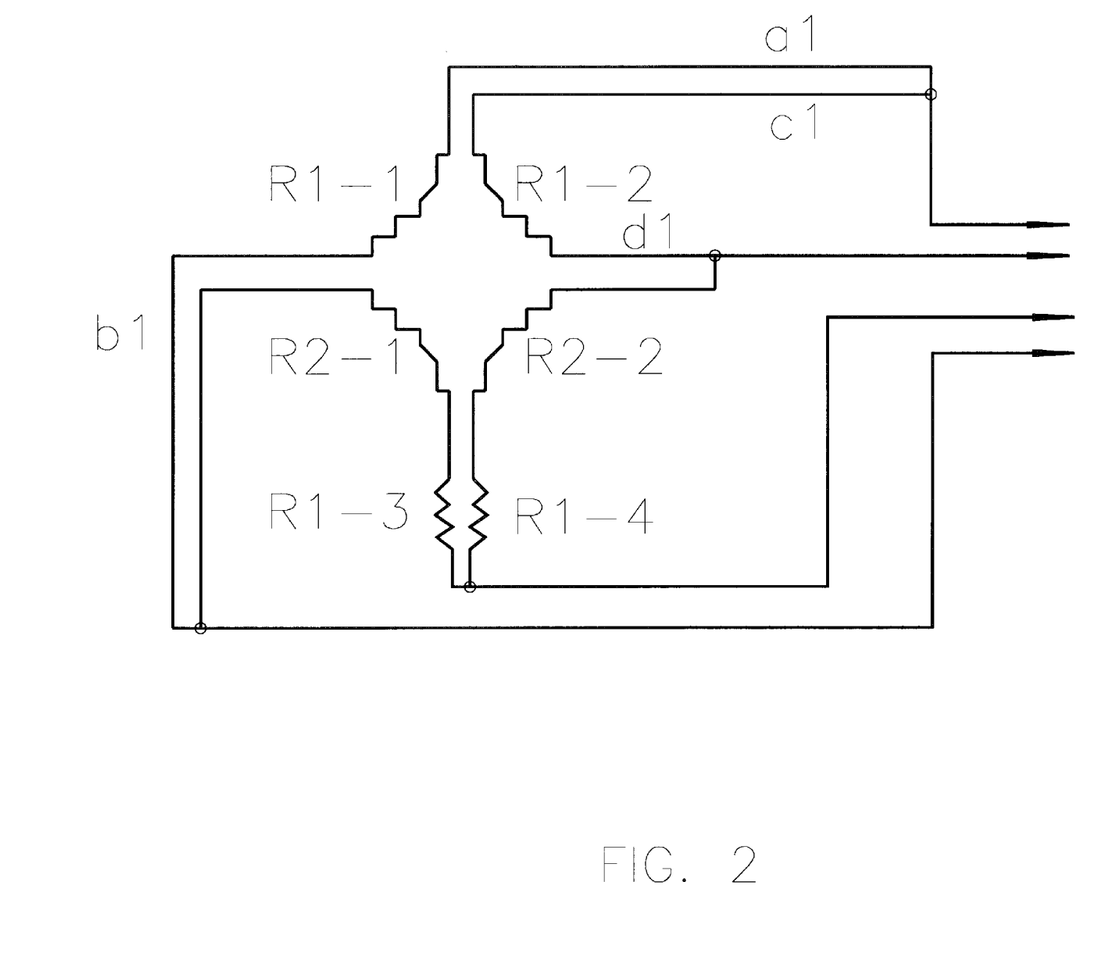
FIG. 2 is an electric diagram illustrating connection of strain gauges for measuring forces acting in one direction.

Examples of sensing elements 38 and 40 suitable for the above purposes are strain gauges of N2AQ-XX-S061P-350 type produced by Measurement Group VISHAY, Raleigh, N.C., USA. Such a sensing element normally comprises a thin-film serpentine-type resistor which can be connected to one arm of a bridge-type or a potentiometric electric measurement circuit. An example of a bridge-type connection circuit for sensitive elements 38, 38a suitable for the aforementioned strain gauges is shown in FIG. 2. This circuit contains a pair of strain gauge resistors R1-1, R1-2 in two arms of the bridge and a pair of strain gauge resistors R2-1 and R2-2 for another pair of arms of the bridge. Reference numerals R1-3 and R1-4 designate balancing resistors used for balancing the bridge. Balancing resistors R1-3 and R1-4 are located outside the beam 12. Although in FIG. 2 each strain gauge unit 38, 38a, 40, and 40a is shown for simplicity with two lead wires going from the gauge to respective contacts of the measuring and registering instrument (not shown), it is understood that in reality each strain gauge has four lead wires. This is because, as shown in FIG. 1A, each strain gauge consists of two parts.

It is understood that in FIG. 2 the electric bridge circuit is shown conventionally and that only the strain gauge resistors R1-1, R1-2, R2-1, and R2-2 are attached to the deformable portions of the sensor. In the context of the present invention, the deformable portions are portions at both ends of the beam where the cross section is weakened by the notches. In general, the beam 12 has two pairs of deformable portions. One pair of deformable portions W1, W2 is formed on both sides at one end of the beam (FIG. 1A and FIG. 1B). Another pair of deformable portions W3, W4 is formed on both sides at the opposite end of the beam (FIG. 1A and FIG. 1B). A strain gauge 38, which is attched to deformable portion W1, is shown with two lead wires $a_1$, $b_1$, (FIG. 1A), and a strain gauge 38a, which is attched to the deformable portion W2, is shown with two lead wires $c_1$, and $d_1$. A strain gauge 40, which is attched to deformable portion W3, is shown with two lead wires $a_2$, $b_2$ (FIG. 1A), and a strain gauge 40a, which is attched to the deformable portion W4, is shown with two lead wires $c_2$, and $d_2$.

Figure 3:
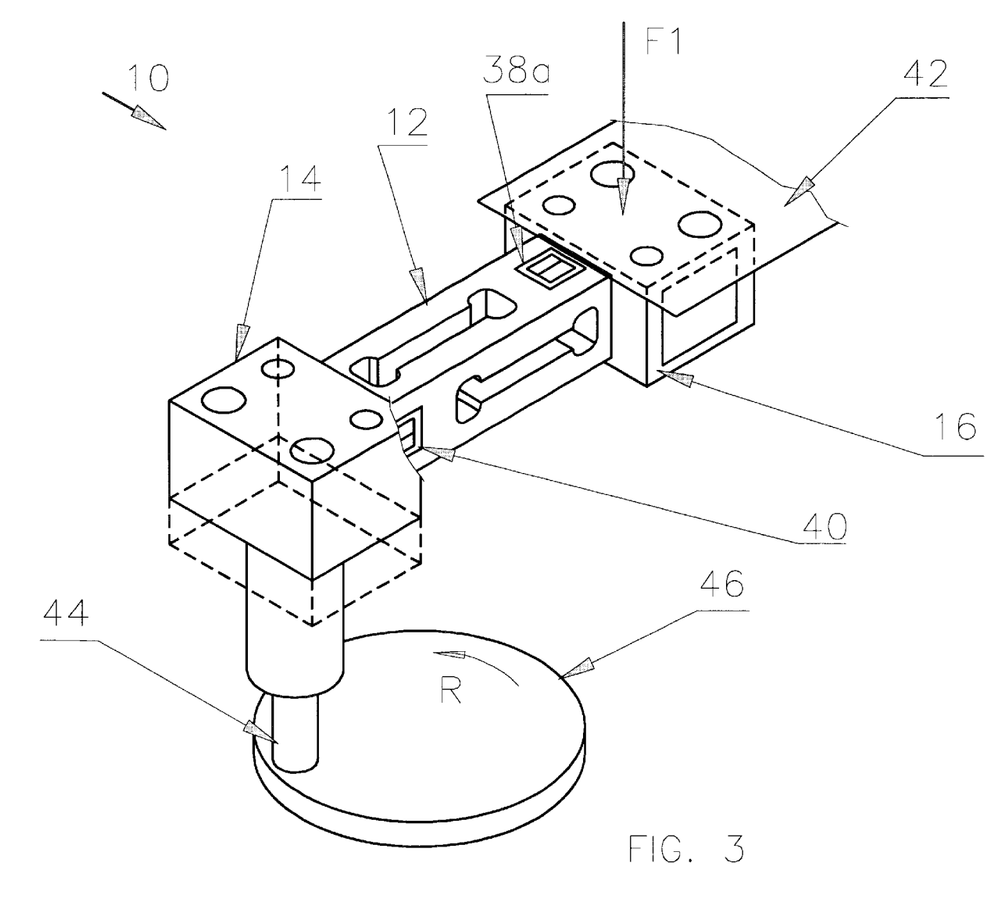
FIG. 3 is a schematic view illustrating the use of the sensor of FIG. 1 in a friction tester.

The sensor 10 of the invention shown operates as follows:

Let us assume that the sensor 10 is used in a friction tester (not shown in its entirety) and that the solid end block 16 is rigidly fixed to a loading unit 42 of the tester moveable in the direction of axis Y for applying a known force F1. This is shown in FIG. 3 which is a schematic view illustrating the use of the sensor 10 in a friction tester. The solid end block 14 has a limited freedom of movement to ensure deformation within the range of measurements. The solid end block 14 supports a contact probe 44 which is in contact with a disk 46 of a test material being tested.

Figure 4:
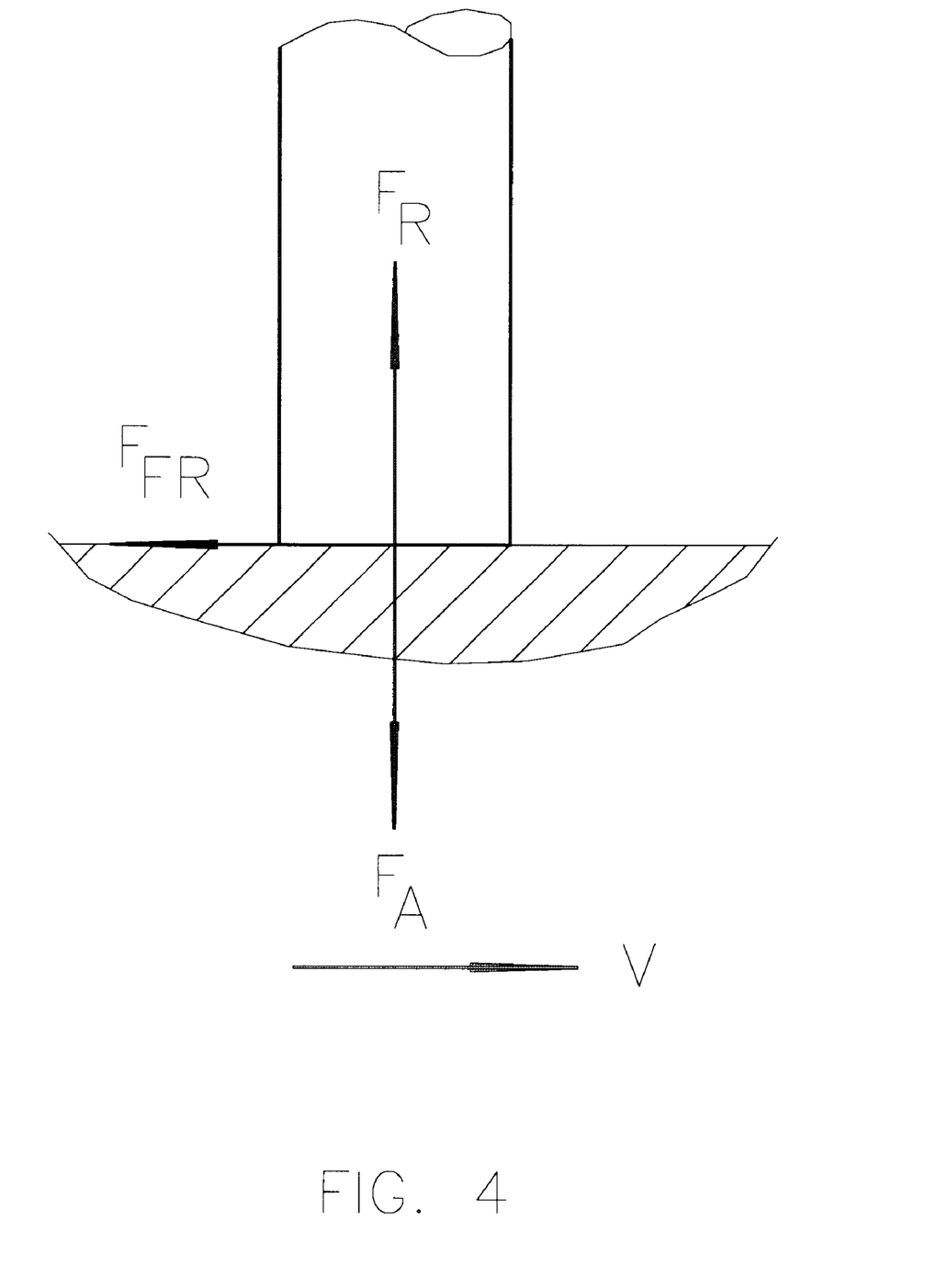
FIG. 4 is a diagram illustrating forces acting on the sensor.

In the course of testing, the test material disk 46 is brought into rotation, e.g., in the direction shown by an arrow R, and then a loading force F1 is applied to the solid end block 14 whereby the probe 44 comes into contact with the rotating disk 46. Application of force F1 causes interaction between the probe 44 and the test material disk 46. The aforementioned interaction generates forces shown in FIG. 4 and deforms the beam 12 and hence the strain gauges. Due to the provision of the slot 20 with notches 26 and 28, the beam is deformed under effect of force F1 in a Y-Z plane as a first parallelogram so that the material of the beam is compressed on the side of the strain gauge 38 (FIG. 1A) and is stretched on the side of the strain gauge 38A (FIG. B). $F_A$ designates the force with which the probe 44 acts on the test material disk 46, $F_R$ is a reaction force with which the test material disk 46 acts on the probe 44, and $F_{FR}$ designates a friction force. Due to the provision of the slot 18, the force $F_{FR}$ deforms the beam 12 as a second parallelogram in X-Z plane so that the material of the beam is stretched on the side of strain gauge 40 (FIG. 1A) and is compressed on the side of strain gauge 40a (FIG. 1B). As the surface area $S_1$, $S_3$ and $S_2$, $S_4$ are deformed, the strain gauges 38, 38a, 40, 40a are also deformed. This deformation changes resistances of the resistors in the second bridge circuit which is not shown in the drawings and which is idenical to the circuit shown in FIG. 2. The values of the resistances are measured in the friction force tester as the reaction force $F_R$ and friction force $F_{FR}$ in a manner known in the art. It is understood that the response of the sensor to the applied force F1, i.e., the reaction force $F_R$ and the friction force $F_{FR}$ will depend on the magnitude of the applied force F1.

Figure 5:
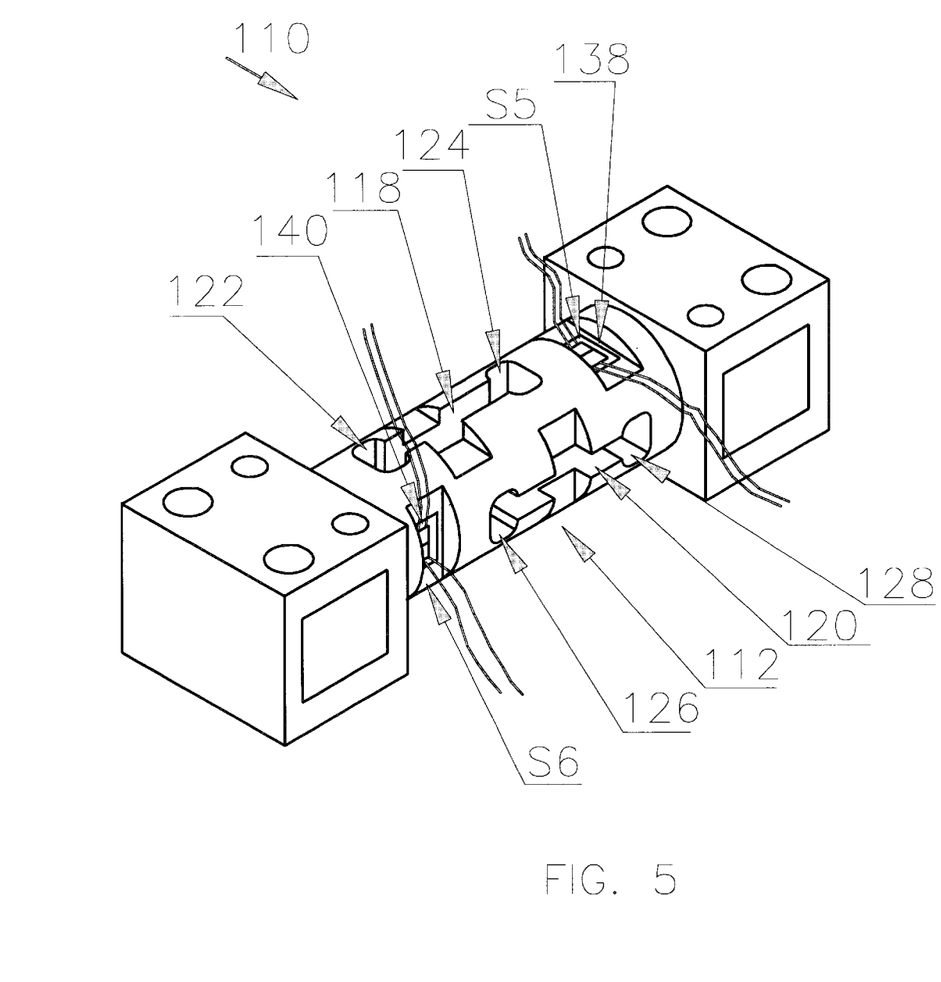
FIG. 5 is a view of the sensor similar to FIG. 1 but with a beam of a round cross section.

FIG. 5 illustrates a sensor 110 which is similar to the one shown in FIG. 1A and differs from it in that a deformable beam 112 has a round cross section. Similar to the embodiment of FIG. 1A, the beam 112 has through slots 118, 120 with through notches 122, 124 and 126, 128 on the ends of the respective slots. In addition to the notches 122, 124 and 126, 128, the deformable portions of the beam are defined by flats $S_5$ and $S_6$ and by another pair of flats which are invisible in FIG. 5 and which, similar to the case of FIG. 1B, are located on the sides of the round beam opposite to the flats $S_5$ and $S_6$. In particular, the flat $S_5$, $S_6$ and two other flats impart to the beam flexibility additional to that provided by the notches 122, 124, 126, 128 for deformation under effect of a force acting in the direction of axes X and Y. Another function of the flats is to serve for convenient attachment of strain gauges 138 and 140.

The round cross-section of the beam simplifies the construction and manufacturing of the sensor 110 and reduces its cost, whereas provision of the flats increases sensitivity of the beam to forces being measured. The remaining elements of the sensor 110 and principle of operation are the same as in connection with the sensor 10 of FIGS. 1A through 4 and therefore their description is omitted.

Thus it has been shown that the invention provides a bidirectional load measurement sensor, which allows to decrease the overall length of the sensor, increase its sensitivity, reduce susceptibility to natural frequency resonance, decrease temperature errors, improve accuracy of measurement, and increase the dynamic range of forces to be measured. The invention improves compactness of the aforementioned sensor and ensures high rigidity in the force transmission direction.

The invention has been shown and described with reference to specific embodiment which should be construed only as an example and do not limit the scope of practical applications of the invention. Therefore any changes and modifications in materials, shapes, electric diagrams and their components are possible provided these changes and modifications do not depart from the scope of the patent claims. For example, the electric bridge circuit shown in FIG. 2 can be a circuit operating on a.c. current or on d.c. current. The a.c. bridge can be a resonance type bridge circuit. The strain gauge resistors can be represented by a part of a potentiometric circuit. The resistor-type strain gauges can be replaced by capacitive-type strain gauges. The sensing elements of such type can be a part of a dilatometric measurement circuit in which deformation of the gauge proportionally changes capacity of the sensing element. Although the sensor was mentioned for use in measuring a load force and a friction force, it is understood that it can be used for other purposes, such as measuring bending moments in two directions. In association with known masses properly attached to the sensor, the latter can be used as an acceleration and velocity sensor. The solid end blocks 14 and 16 can be fixed and attached to fixation and actuating elements in a variety of modes. The test material which is in contact with the probe, can be stationary, and the probe can be moveable. The beam may have an elliptical, or any other cross-section and the direction of applied forces may not necessarily be mutually perpendicular. The slots and notches may have shapes different from those shown in the drawings. The beam itself can be assembled from several parts. The beam can be formed without notches, i.e., only with two pairs of through slots. The deformable beam not necessarily should be a solid body with the notches and slots and can be formed by four or more deformable rods, plates, or tubes which together may form two mutually perpendicular parallelograms. The strain gauges contained in one bridge circuit may have any other suitable location, e.g., on the same side of the beam instead of opposite sides of the beam.

What is claimed is:

1. A bidirectional force sensor comprising:
    a deformable beam having a longitudinal axis and comprising a first parallelogram deformable in one direction and a second parallelogram deformable in another direction which is different from said one direction and is not parallel thereto, said first parallelogram having a first axis which coincides with said one direction and a another axis which coincides with said another direction, said first parallelogram being at least partially overlapped with said second parallelogram in the direction of said longitudinal axis; and
    a first pair of deformation sensitive means for sensing deformations of said deformable beam in the direction of said first axis; and
    a second pair of deformation sensitive means for sensing deformations of said deformable beam in the direction of said second axis.

2. The biderectional force sensor of claim 1, where said beam is a solid body, said first parallelogram is formed at least by a first through slot passing through said beam in the direction of said first axis, and said second parallelogram is formed at least by a second through slot passing through said beam in the direction of said second axis.

3. The bidirectional force sensor of claim 2, further comprising a first deformable portion on said one end of said deformable beam and a second deformable portion on said end opposite to said one end, said first deformable portion and said second deformable portion being formed by a first pair of through notches which are wider than said first slot and which are connected to both ends of said first slot, and by a a second deformable portion formed by a pair of through notches which are wider than said second slot and which are connected to both ends of said second slot.

4. The bidirectional force sensor of claim 3, wherein said deformation sensitive means are strain gauges comprising a first strain gauge attached to said first deformable portion on one side of said deformable beam, a second strain gauge attached to said first deformable portion on the side of said deformable beam opposite to said one side, a third strain gauge attached to said second deformable portion on said one side, and a fourth strain gauge attached to said second deformable portion on the side of said deformable beam opposite to said one side.

5. The bidirectional force sensor of claim 4, wherein said first strain gauge and said second strain gauge are electrically connected to a first electric bridge circuit, and said third strain gauge and said fourth strain gauge are electrically connected to a second electric bridge circuit.

6. The bidirectional force sensor of claim 1, wherein said deformable beam further comprises a first beam attachment connected to said one end of said deformable beam and a second attachment connected to said end opposite to said one end.

7. The bidirectional force sensor of claim 3, wherein said deformable beam further comprises a first beam attachment connected to said one end of said deformable beam and a second BEAM attachment connected to said end opposite to said one end.

8. A method of measuring a friction force on a friction tester provided with a deformable beam for transmitting a loading force from a loading unit of said friction tester to a probe which is in contact with a test material, said deformable beam having a first pair of deformation sensitive elements on one end of said deformable beam and a second pair of deformation sensitive elements on the end of said beam opposite to said one end, said method comprising:

forming said deformable beam in a form of a first deformable parallelgram deformable under effect of said loading force in a first direction and a second deformable parallelgram deformable under the effect of said friction force in a second direction which is different from said first direction and is not parallel thereto, said first deformable parallelgram and said second deformable parallelogram being at least partially overlapped;

providing said first deformable parallelgram with a first pair of deformable portions;

providing said second deformable parallelogram with a second pair of deformable portions;

attaching a first pair of deformation sensing elements to said first pair of deformable portions, respectively;

attaching a second pair of deformation sensitive elements to said second pair of deformable portions, respectively;

applying to said deformable beam said loading force and developing a friction force thus deforming said deformable beam simultaneously in said first direction and in said second direction; and measuring the deformation of said deformable beam in said first direction and in said second direction for determining said friction force in terms of the deformation in said second direction.

* * * * *